United States Patent
Kikuchi et al.

(10) Patent No.: US 6,298,143 B1
(45) Date of Patent: *Oct. 2, 2001

(54) MOVING TARGET DETECTING SYSTEM AND MOVING TARGET DETECTING METHOD

(75) Inventors: Minoru Kikuchi, Kanagawa; Yasuhiro Taniguchi, Osaka, both of (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,695

(22) Filed: Apr. 2, 1998

(30) Foreign Application Priority Data

Apr. 3, 1997 (JP) .................................................... 9-085176
Jan. 13, 1998 (JP) .................................................. 10-005145

(51) Int. Cl.⁷ .................................................... G06K 9/00
(52) U.S. Cl. ............................................ 382/103; 348/169
(58) Field of Search .......................... 382/103, 48, 118, 382/107, 106; 356/4.01; 348/169; 364/449

(56) References Cited

U.S. PATENT DOCUMENTS

| | | | |
|---|---|---|---|
| 4,870,692 | 9/1989 | Zuiderveld et al. | 382/107 |
| 5,012,522 | * 4/1991 | Lambert | 382/103 |
| 5,034,986 | * 7/1991 | Karmann | 382/103 |
| 5,109,435 | * 4/1992 | Lo | 382/103 |
| 5,317,685 | 5/1994 | Morimura et al. | 345/474 |
| 5,557,323 | * 9/1996 | Kajiwara | 348/140 |
| 5,627,586 | * 5/1997 | Yamassaki | 348/169 |
| 5,644,386 | * 7/1997 | Jenkins | 356/4.01 |
| 5,883,969 | * 3/1999 | Le Gouzouguec | 382/103 |

FOREIGN PATENT DOCUMENTS

| | | |
|---|---|---|
| 63-149772 | 6/1988 | (JP) . |
| 4-29477 | 1/1992 | (JP) . |
| 4-111079 | 4/1992 | (JP) . |

* cited by examiner

Primary Examiner—Joseph Mancuso
Assistant Examiner—Abolfazl Tabatabai
(74) Attorney, Agent, or Firm—Oblon, Spivak, McClelland, Maier & Neustadt, P.C.

(57) ABSTRACT

A moving target detecting system for identifying a moving target by distinguishing the moving target from a background precisely and quickly is disclosed. In the system, an image pick-up unit for picking up images of an objective area including at least an identical region up to two screens or more on a time series basis, a feature value detecting unit for dividing respective images, which have been picked up by the image pick-up unit into plural segments to have substantially identical profiles and then detecting image feature values in connection with brightness information in respective segments from each of the plural segments, and a discriminating unit for discriminating the moving target based on differences in locations between respective segments which can exhibit substantially identical image feature values, by comparing the image feature values in respective segments on one screen out of the screens, from which the image feature values are detected by the feature value detecting unit, with the image feature values in respective segments on another screen on a time series basis provided.

18 Claims, 10 Drawing Sheets

MOVING TARGET DETECTING SYSTEM AND MOVING TARGET DETECTING METHOD

BACKGROUND OF THE INVENTION

1. Field of the Invention

The present invention relates to a moving target detecting system and a moving target detecting method.

2. Description of the Related Art

Various proposals have been put forth with respect to a moving target detecting system which is suitable for tracking other flying airplanes, etc. if loaded on a guided missile, a military airplane, etc., for example, and a moving target detecting method for use in the moving target detecting system.

As an example, in the event that the guided missile tracks other moving airplanes, such a system has been known that a image pick-up device such as CCD camera is loaded on the guided missile to pick up a spatial domain including a target airplane as a still image, and then an image pattern of the airplane can be grasped by scanning the still image as a whole in unit of pixel to thus detect the presence of the moving target and its location.

More particularly, the system has been known wherein, for example, brightness average of the resultant still image is calculated, and then the brightness in respective pixels of the still image are compared with each other to thus identify/extract the image of the target whose brightness is considerably different from a brightness average level, so that the target can be detected by removing a background such as cloud, land, etc. from the picked-up image.

However, such system needs a plenty of processing time to discriminate/extract the moving target from the overall still image since one frame of the overall still image in the picked up area is scanned in unit of pixel to thus carry out the image processing for profile pattern recognition.

Besides, another system has been proposed wherein, for example, processing gates are provided in the vicinity of the target which has been extracted once to improve a processing speed and then an input signal level to an image processor can be adjusted by calculating brightness average within the processing gates.

Meanwhile, if the image pattern of the background having the brightness which is resemble and confusing to that of the target, e.g., the images of land and cloud, in addition to the image of the target exists in the picked-up image, difference in brightness between the moving target as an object and the background other than the moving target, i.e., contrast between them has been made relatively vague because of influence of the sunlight, etc., otherwise the contrast has dispersed over the screen as a whole although the contrast is sharp. For this reason, such a problem has been arisen that it is not easy to distinguish the target from the background precisely by identifying the target only and thus to detect the target quickly. Even if the processing gates are provided, the brightness average level becomes an inadequate value, for example, when the background image pattern enters into the processing gates. Therefore, such situation has occurred similarly.

SUMMARY OF THE INVENTION

A main object of the present invention is to provide a moving target detecting system and a moving target detecting method, which are capable of identifying a moving target by distinguishing the moving target precisely from the background and thus to detect the target precisely and quickly.

In order to achieve the above object, according to a first aspect of the present invention, there is provided a moving target detecting system comprising:

image pick-up means for picking up images of an objective area including at least an identical region up to two screens or more on a time series basis;

feature value detecting means for dividing respective images, which have been picked up by the image pick-up means into plural segments to have substantially identical profiles and then detecting image feature values in connection with brightness information in respective segments from each of the plural segments; and discriminating means for discriminating the moving target based on differences in locations between respective segments which can exhibit substantially identical image feature values, by comparing the image feature values in respective segments on one screen out of the screens, from which the image feature values are detected by the feature value detecting means, with the image feature values in respective segments on another screen on a time series basis.

In such detecting system of the present invention, more particularly, in the feature value detecting means, the picked-up images are divided into plural segments and the image feature values in the segments are detected. In the discriminating means, only the target is detected with the use of motional difference between the moving target and the background other than the moving target in the change of the images on a time series basis based on the detected image feature values in respective segments.

Like this, since the discriminating means distinguishes the moving target from the background other than the moving target according to the change of the image on a time series basis based on the image feature values in respective segments, a calculation amount in the discriminating means is in proportion to the number of segments of the image.

Therefore, since process calculation amount can be limited by selecting the number of the segment, the process calculation time required for detection of the moving target can be reduced extremely.

In addition, in such detecting system of the present invention, since there exists difference in relative locations, i.e., difference between the moving direction and the moving distance of the overall background segments and the moving direction and the moving distance of in the segments including the moving target if two screens are relatively compared on a time series basis, the moving target can be distinguished from the background to be detected.

Accordingly, even if the segments having the contrast to the same degree are scattered and therefore sufficient contrast to identify the moving target as a whole screen cannot be obtained although some contrast can be detected in the vicinity of the moving target, differences in relative location displacement occur between the particular segments wherein the moving target exists and remaining majority segments. Therefore, the moving target can be detected more precisely.

According to a second aspect of the present invention, there is provided a moving target detecting method comprising the steps of:

picking up images of an objective area including at least an identical region up to two screens or more on a time series basis;

segmenting the images picked up by the images picking-up step into plural segments each having a substantially identical profile;

calculating image feature values in connection with brightness information in respective segments which are divided by the segmenting step;

extracting differences in locations between the segments which exhibit substantially identical image feature values as respective vectors, by comparing the image feature values in respective segments, which have been calculated by the image feature values calculating step, with each other between two screens or more correspondingly on a time series basis; and separating/detecting the moving target based on respective vectors which have been extracted by the extracting step.

In such detecting method of the present invention, the picked-up images are divided into plural segments on a time series basis in the segmenting step and the image feature values calculating step, and then only the target is detected from position displacements between the segments having the substantially identical image feature values on both screens, by distinguishing from the background based on the image feature values in respective segments.

Like this, since the moving target is separated and extracted based on the segment number of the image via location detection of the segments having the substantially identical image feature values, a calculation amount can be limited and the process calculation time required for detection of the moving target can be reduced significantly.

In addition, even if the contrast is relatively small over the whole screen, the moving target can be detected more precisely with the use of the fact that characteristic differences with respect to relative location occur between the segments wherein the moving target exists and remaining majority segments.

According to a third aspect of the present invention, there is provided a moving target detecting method comprising:

a step of picking up images of an objective area including at least an identical region up to two screens or more on a time series basis;

a first segmenting step of segmenting the images, which have been picked up by the images picking-up step into plural segments each having a substantially identical profile;

a first image feature values calculating step of calculating image feature values in connection with brightness information in respective segments which have been segmented by the first segmenting step;

a first location extracting step of extracting differences in locations between the segments which exhibit substantially identical image feature values as respective vectors, by comparing the image feature values which have been calculated by the first image feature values calculating step in respective segments with each other between two screens or more correspondingly on a time series basis;

a first separating/detecting step of separating/detecting the moving target based on respective vectors which have been extracted by the first location extracting step;

a second segmenting step of segmenting respective segments on two screens or more, which include the moving target detected by the first separating/detecting step, into plural segments each having another substantially identical profile;

a second image feature values calculating step of calculating image feature values in respective segments which have been segmented by the second segmenting step;

a second location extracting step of extracting differences in locations between the segments which exhibit substantially identical image feature values as respective vectors, by comparing the image feature values which have been calculated by the second image feature values calculating step in respective segments with each other between two screens or more on a time series basis; and a second separating/detecting step of separating/detecting the moving target based on respective vectors which have been extracted by the second location extracting step.

In such detecting method of the present invention, respective segments of two screens including the moving target, which are detected once by the first separating/detecting step are divided into plural segments by the second separating/detecting step, then the image feature values in respective segments are calculated, and then the moving target is separated/detected via the second location extracting step and the second separating/detecting step.

In this manner, such detecting method executes segmentation of the picked-up image in plural hierarchies, and succeeding separation process is executed hierarchically by limiting the detection area of the moving target detected by the preceding separation process.

Accordingly, since the moving target can be detected in finer segments sequentially by overlapping the hierarchy, the target can be detected in short time with high resolution and with a smaller process amount as a whole.

According to a fourth aspect of the present invention, there is provided a moving target detecting system comprising:

image picking-up means for picking up a first image of an objective area;

first segmenting means for segmenting an area of the first image, which has been picked up by the image picking-up means into plural segments;

first target detecting means for detecting the target based on image feature values in respective segments formed according to segmentation by the first segmenting means;

first target acquire area setting means for setting up a first target acquire area in which the target detected by the first target detecting means is included therein;

second target acquire area setting means for setting up a second target acquire area corresponding to the first target acquire area in an area of a second image, which has been picked up by the image picking-up means, after the first target acquire area has been set up by the first target acquire area setting means;

second segmenting means for segmenting the second target acquire area, which has been set up by the second target acquire area setting means, into plural segments; and second target detecting means for detecting the target based on the image feature values in respective segments in the second target acquire area, which have been segmented by the second segmenting means.

In such detecting system of the present invention, since reduction of processed data amount can be achieved by segmenting (separating into blocks) the picked-up image prior to target detection, rapid detection process and calculation can be implemented.

In particular, since the second target acquire area is set up on the second picked-up image and also segmentation is applied to a limited area, process data can be reduced further more. Hence, rapid target detection together with improvement of the detection rate can be attained.

According to a fifth aspect of the present invention, there is provided a moving target detecting method comprising:

a first image picking-up step of picking up a first image of an objective area;

a first segmenting step of segmenting an area of the first image, which has been picked up by the image picking-up means, into plural segments;

a first target detecting step of detecting the target based on image feature values in respective segments formed according to segmentation by the first segmenting step;

a first target acquire area setting step of setting up a first target acquire area in which the target detected by the first target detecting step is included therein;

a second image picking-up step of picking up a second image of the objective area after the first target acquire area setting step has been completed;

a second target acquire area setting step of setting up a second target acquire area corresponding to the first target acquire area in the second image, which has been picked up by the second image picking-up step;

a second segmenting step of segmenting the second target acquire area, which has been set up by the second target acquire area setting step, into plural segments; and a second target detecting step of detecting the target based on the image feature values in respective segments in the second target acquire area, which has been segmented by the second segmenting step.

In such detecting method of the present invention, since reduction of processed data amount can be achieved by segmenting (separating into blocks) the picked-up image prior to target detection, rapid detection process and calculation can be implemented. In addition, since the second target acquire area is set up on the second picked-up image and also segmentation is applied to a limited area, process data can be reduced much more. Hence, rapid target detection as well as improvement of the detection rate can be attained.

BRIEF DESCRIPTION OF THE DRAWINGS

FIGS. 2A and 2B are views showing images picked up by an image pick-up device shown in FIG. 1, wherein FIG. 2A shows a current image and FIG. 2B shows an image taken t second before;

FIGS. 6A and 6B are image examples wherein the image picked up by the image picked-up device shown in FIG. 1 is divided into sixteen segments in the vertical and lateral directions respectively, wherein FIG. 6A shows a current image and FIG. 6B shows an image taken t second before;

FIGS. 7A and 7B are views showing transition of the processes for image screens according to a second embodiment of the present invention, wherein FIG. 7A shows a current image respectively and FIG. 7B shows an image taken t second before respectively;

DESCRIPTION OF THE PREFERRED EMBODIMENTS

A moving target detecting system and a moving target detecting method according to the present invention will be explained in detail with reference to the accompanying drawings appropriately hereunder.

Figure 1:
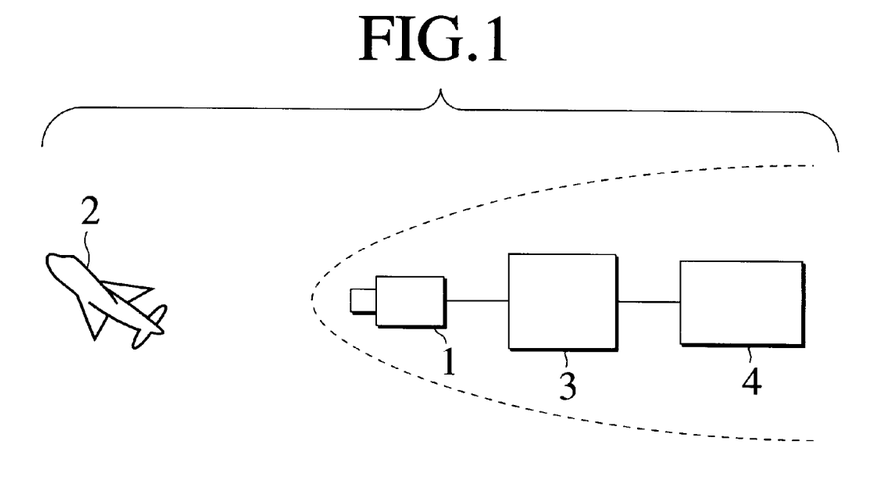
FIG. 1 is a schematic view showing a configuration according to a first embodiment of the present invention.

FIG. 1 is a schematic view showing a configuration for use in explanation of a moving target detecting system and a moving target detecting method according to a first embodiment of the present invention.

In FIG. 1, a reference 1 denotes a image pick-up device such as a CCD camera; 2, a moving target such as a flying airplane; 3, a detector for detecting image feature values, e.g., brightness detector; and 4, a discriminator circuit for discriminating only the moving target 2 which makes a different movement from a background to thus detect the target.

As shown in FIG. 1, in the first embodiment, first the image pick-up device 1 such as the CCD camera loaded on the guided missile, etc. picks up images of a spatial domain including the moving target 2 at a certain time interval (t second).

Digital image signals obtained by the image pick-up device 1 are supplied to the brightness detector 3 to detect the image feature values. Where the "image feature value" signifies a value indicating a feature of the image in connection with brightness. In particular, at least one of brightness, a brightness average, a brightness variance, a brightness change rate, and a brightness differential value may be employed as the image feature value. For convenience of explanation, the brightness and the brightness average will be treated as the image feature values hereinafter.

Next, the brightness detector 3 stores images of the spatial domain including the moving target 2 which have been taken at a time interval of t seconds, i.e., both a current image and an image taken t second before into its memory. Then, the brightness detector 3 executes segmentation of respective images in the same manner.

Figure 2A:
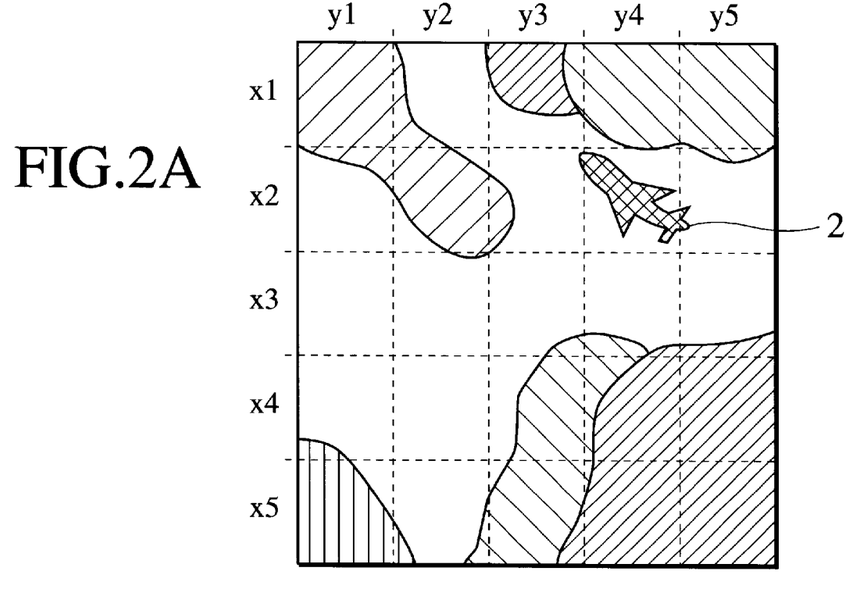
Figure 2B:
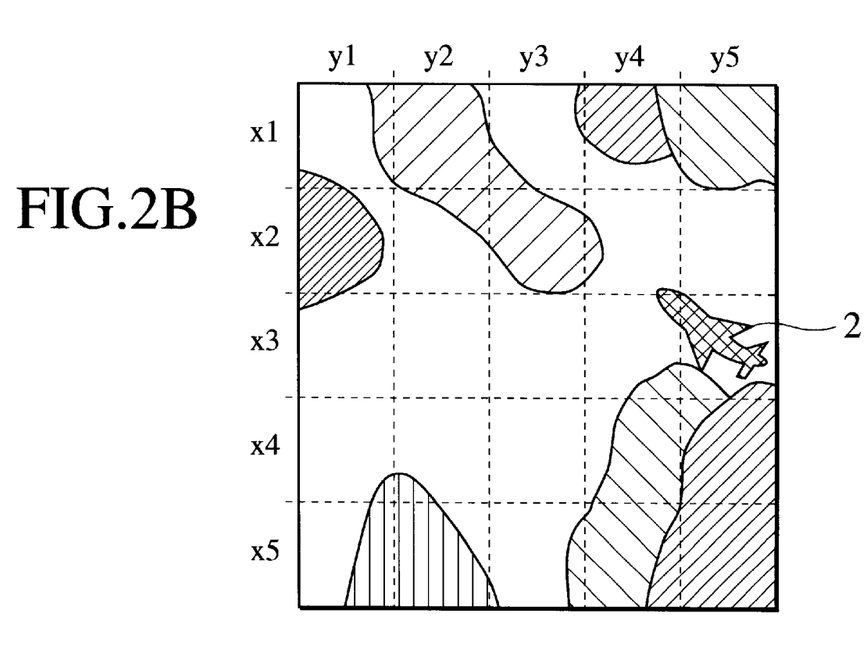

In the first embodiment, it is assumed that, as shown in FIGS. 2A and 2B, the current image and the image taken t second before are obtained by the image pick-up device 1 and that, for the sake of explanation, respective images are divided into five segments (x1, x2, ..., x5; y1, y2, ..., y5) in the vertical and lateral directions respectively. In FIG. 2, images of stationary objects other than the moving target 2, i.e., images of lands, clouds, etc. are depicted by oblique lines and vertical lines.

The brightness detector 3 sums up brightness in respective segments in unit of pixel and then calculates a brightness average as an average value of the overall brightness.

Figure 3A:
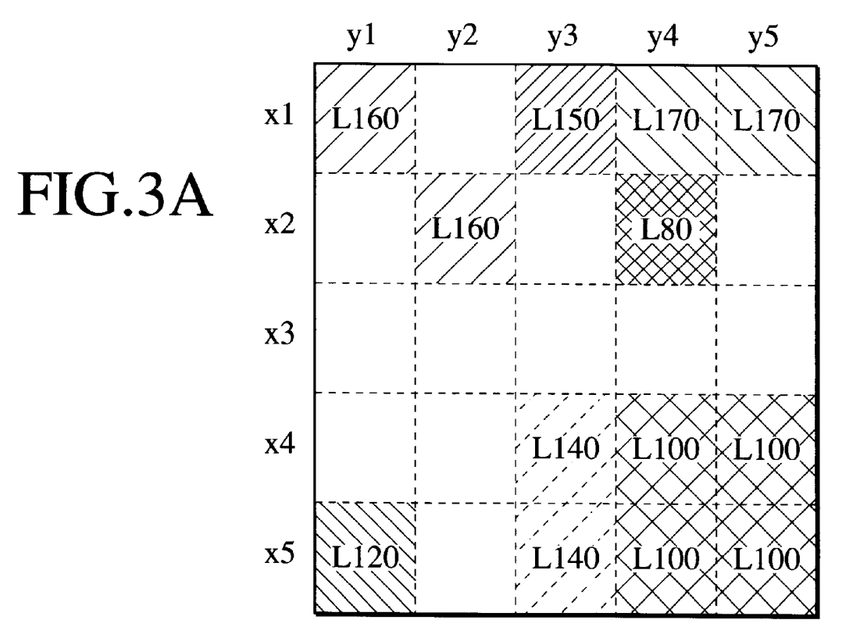
FIGS. 3A and 3B are views showing brightness averages in respective segments into which images shown in FIGS. 2A and 2B are divided respectively.
Figure 3B:
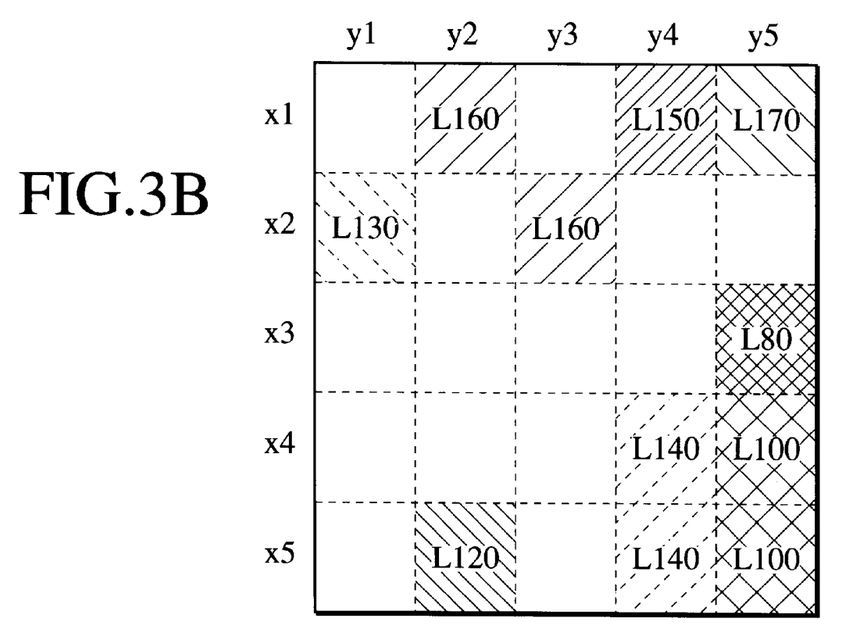

FIGS. 3A and 3B are views showing resultant brightness averages in respective segments, each of which is displayed as a gray level representation and in which the gray level number is indicated by appended numerals. Where 256 gray levels are employed in order to execute high precision processing. The gray level representation of the bright background area is omitted from FIGS. 3A and 3B.

Next, brightness average information in respective segments of the picked-up images taken at present and t second before respectively are supplied to the discriminator circuit 5 shown in FIG. 1.

Based on the brightness average information in respective segments supplied from the brightness detector 3, the discriminator circuit 4 can compare image signals of the image taken t seconds before with image signals of the current image at different times on a time series basis. Then, the discriminator circuit 4 discriminates only the moving target which takes a different movement from the background to thus detect the moving target.

Next, comparing procedures executed in the discriminator circuit 4 will be explained hereunder.

In the comparing procedures executed in the discriminator circuit 4, first of all, brightness in a predetermined range with the corresponding segment (x1, y1 in FIG. 3B as a center, for example, brightness in the segments including neighboring segments are compared with the reference brightness average (L160) in an upper left corner segment (x1, y1) of the current picked-up image shown in FIG. 3A. Then, the segments in FIG. 3B having the brightness average values close to the reference brightness average (L160) are selected as corresponding candidates.

More particularly, the segment (x1, y2) having the brightness average L160 in the picked-up image in FIG. 3B corresponds to the segment (x1, y1) in FIG. 3A.

Similarly, the brightness average in the succeeding segment (x1, y2) in FIG. 3A is compared with those in the segments in a predetermined range with the corresponding segment (x1, y2) in FIG. 3B as a center. As a result, there is possibility that three segments, i.e., segments (x1, y1), (x1, y3), (x2, y2) in FIG.3B correspond to the segment (x1, y2) in FIG. 3A.

In the following, while using respective brightness averages of the current images in the segments (x1, y3), (x1, y4), . . . , (x5, y5) as a reference sequentially, brightness in the segments within a predetermined range with corresponding segments as a center respectively is compared with each other on the screen which displays the image taken t second before, and then the segments which exhibit the substantially identical brightness average are selected as corresponding candidates. Then, directions and lengths from the segments being selected as corresponding candidates in the image taken t second before to the segments in the current image are stored into the memory of the discriminator circuit 4 shown in FIG. 1 as moving data.

In this fashion, directions and lengths in all corresponding segments, i.e., motion vectors can be detected between both images by nominating the candidates during a relatively short time interval in second order such as t second or less. The motion vectors are such vectors that are directed from the center in the image taken t second before to the center in the current image between the corresponding segments in both images.

It is of course that, in many cases, originally there are displacements of the segments to be picked up between the image taken t second before and the current image.

In other words, if both images are compared with each other, the segments being included in the image taken t second before are vanished or disappear from the current image, or alternatively the segments being not included in the image taken t second before enter newly into the current image. This tendency becomes more remarkable as the time t is set longer.

Accordingly, according to the comparing procedures in the discriminator circuit 4, the care must be taken that, even if the segment ranges to be compared with each other are expanded considerably, there can be found no correspondence, i.e., there can be the segments in FIG. 3A wherein no corresponding candidate exists.

Then, it may be supposed that all detected motion vectors formed between respective segments are caused to be moved approximately in the same direction to have the same length in all segments in the background other than the segments wherein the moving target exists.

Where the term "approximately" means that the overall background are also being rotated in the circuitous direction if the missile, etc. loading the image pick-up device 1 thereon is making a circuitous flight, and therefore precisely it may be supposed that differences in the direction and the length appear little by little according to a length from its rotational center axis, so that all the background segments do not always indicate equal motion vectors.

In this case, after process of removing rotating components of the image has been conducted, the motion vectors can be calculated.

In addition, it may be considered that, if distances between the image pick-up device 1 and the background segments are changing, the image is magnified or contracted.

In this case, after the process of removing magnified or contracted components of the image has been executed, the motion vectors are calculated.

Anyway, it may be supposed that all segments other than the segments in which the moving target is included, i.e., background segments have the motion vectors with the same length in the substantially same direction on the picked-up image.

Figure 4:
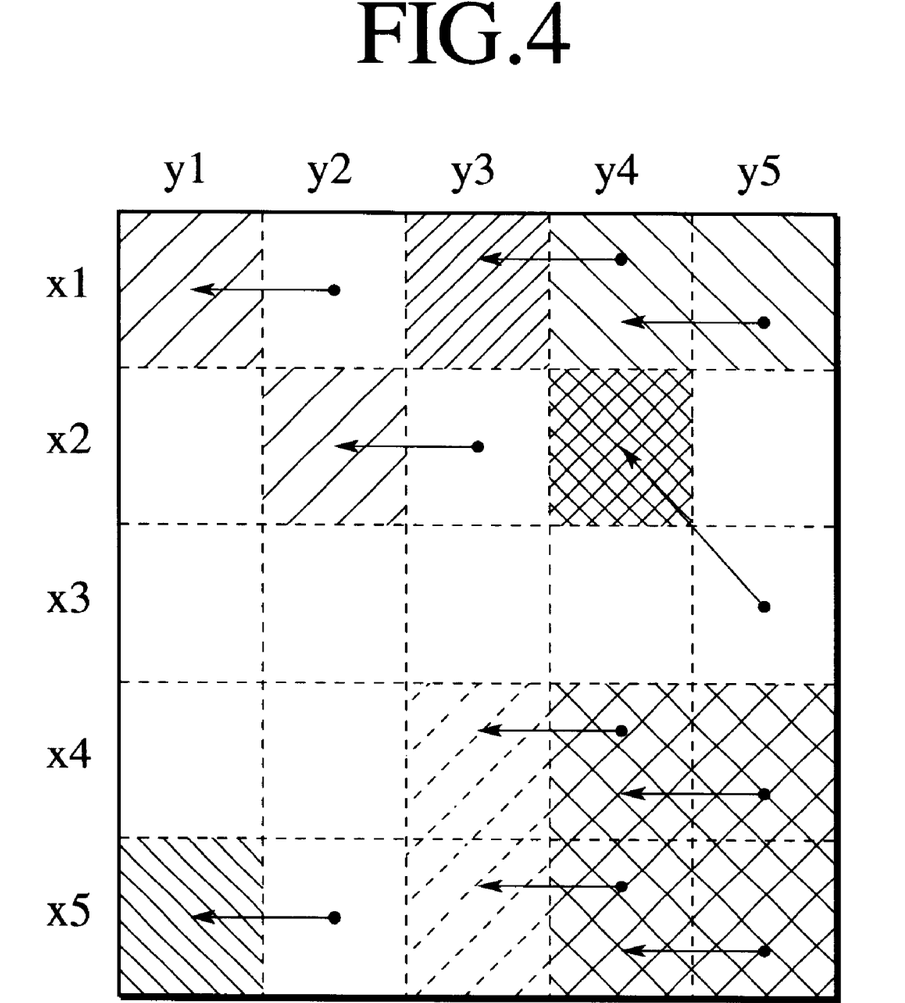
FIG. 4 is a view showing shifting states of respective brightness averages obtained by comparing brightness averages in FIG. 3B with brightness averages in FIG. 3A.

Accordingly, even if the motion vectors which do not precisely represent the movement of the background individually are found sporadically, the motion vectors can be depicted generally in the same direction, as shown in FIG. 4, in the segments occupied by the background except for the segments from (x3, y5) to (x2, y4), in which the moving target 2 exists, according to the statistical process in compliance with the so-called majority principle. In such majority principle, the largest number of vectors are set as the background motion vector after a frequency distribution of the direction and the length of the background motion vector is calculated.

When the picked-up images are viewed from the result of the above, even in the event that segments which are difficult to be distinguished from the moving target in the prior art are scattered since relatively speckled patterns spread over the whole screen, minor error motion vectors can be eliminated according to the majority principle and only the background and the true moving target can be selected and remain.

With the above configuration, if correlation between two picked-up images on a time series basis is established in the discriminator circuit 4, the moving target 2 can be detected by paying attention to the fact that the segments in which the moving target 2 exists exhibit differences in relative locations being different from other segments, more particularly, difference in the motion vectors obtained when original segments are shifted to current positions after t second has elapsed.

Accordingly, it is natural that a processing time based on comparison between the brightness average, which has been shown as an example in the first embodiment, becomes different in accordance with the number of segments.

In the first embodiment, for convenience of explanation, explanations have been made under the assumption that the number of segment has been set to 5×5=25 in the vertical and lateral directions, and that the moving distance of the background area coincides substantially with vertical and lateral lengths of the segments on the images during comparison between the image taken t second before and the current image. As a matter of course, although not always satisfied theoretically, the actual segmentation number can be set to about 100 to 200 in the vertical and lateral direction respectively and therefore the segment number can be set in the range of 10000 to 40000. Therefore, since they coincide substantially with each other by integral multiple, similar process is applicable.

Further, it is preferable that, since the picked-up image includes noises, an allowable range should be set previously to decide the presence of the change when the segments having less brightness change between the image taken t second before and the current image are searched by calculating brightness average every segment.

Furthermore, it is possible to reduce the processing time if the segments which appear only in any one of the images and in which no correspondence can be established between the images can be treated as noises to thus be removed from decision object data.

Of course, attention must be paid that, although there exist the segments wherein no motion vector has been searched, there is a possibility that such segments include the moving target.

In addition, it is a matter of course that, because calculation of the brightness average in respective segments in the brightness detector 3 can be carried out by virtue of simple addition of the digital image signals, etc. in a short time, influence on the processing time of the overall system can be made small.

Here, operation procedures of detecting the moving target in the first embodiment described as above will be explained in brief with reference to a flowchart shown in FIG. 5 hereunder.

Figure 5:
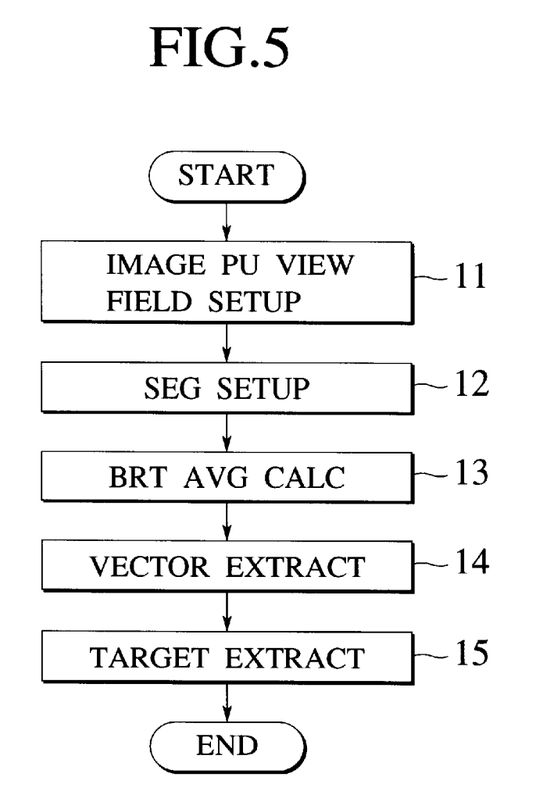
FIG. 5 is a flowchart showing procedures of processes explained mainly from FIG. 2 to FIG. 4.

First, in step 11 described as "IMAGE PU(PICK-UP) VIEW FIELD SETUP" step in FIG. 5, an image picking-up view field of the image pick-up device 1 is set up from prediction conditions such as type and size of the moving target, distance to the moving target, moving direction of the moving target (for example, the moving target is approaching to the imaging direction or going away, or the moving target is moving to intersect with the imaging direction), etc.

Next, in step 12 described as "SEG(SEGMENTS) SETUP" step in FIG. 5, with regard to the detection resolution and the detection time of the moving target, the time interval t to acquire the images and the segment number of the images are set to set up the segments.

Then, in step 13 described as "BRT(BRIGHTNESS) AVG(AVERAGE) CALC(CALCULATE)" step in FIG. 5, the brightness detector 3 segments plural still images obtained by the image pick-up device 1 at a time interval t respectively, then calculates brightness average in respective segments as 256 gray levels, and then stores them into a memory (RAM).

Then, in step 14 described as "VECTOR EXTRACT" step in FIG. 5, the discriminator circuit 4 compares brightness in respective segments located in a limited range between two images at a time interval t on a time series basis, and then extracts relative location relationships (motion vectors) between the segments which have the brightness average within a predetermined allowable range.

Finally, in step 15 described as "TARGET EXTRACT" step in FIG. 5, based on the relative location relationships (motion vectors) derived by step 14, the discriminator circuit 4 separates/extracts the motion vectors of the target from the motion vectors of the background according to the statistical process by virtue of the majority principle.

In this manner, the moving target can be extracted precisely from the motion vectors in the segments on two still images in time series.

In the above explanation, comparison has been made on two still images between the current image and the image picked-up t second before. However, it is of course that the moving target can be tracked continuously by making such comparison sequentially on a time axis. According to such continuous tracking, sequential data processing can be achieved so that detection of the moving target can be accomplished with high reliability.

According to the first embodiment, since the brightness average in the segments can be classified into fine hierarchies like 256 gray levels, for example, the moving target can be detected precisely according to the statistical process based on the majority principle even if the sufficient contrast to discriminate the moving target from the background cannot be detected in the picked-up images, otherwise even if it is vague that any of the segments corresponds to the true moving target since the segments having the contrast partially are scattered widely on the screen.

In addition, of course, calculation process of the brightness average and extraction process of the motion vectors in the brightness detector 3 and the discriminator circuit 4 can be executed by a general-purpose digital signal processor (DSP).

As described above, a processing time after the brightness average every segment has been calculated by the brightness detector 3, i.e., a time necessary for operation in the discriminator circuit 4 becomes longer as the segmentation number of the screen is increased. In other words, the segmentation number is smaller, the process time becomes shorter.

However, since an area of one segment becomes larger on the screen if the segmentation number is reduced smaller, there is a tendency that ambiguity remains in location of the moving target as the object and it is difficult to acquire the moving target with high precision and high resolution.

Figure 6A:
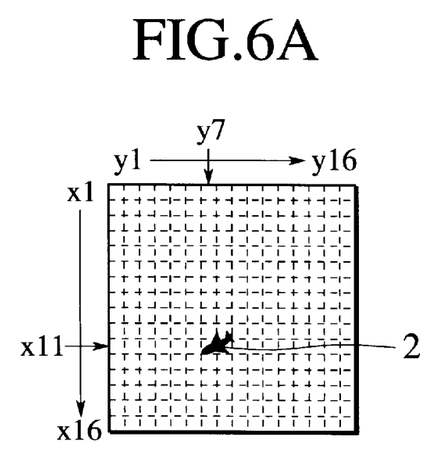
Figure 6B:
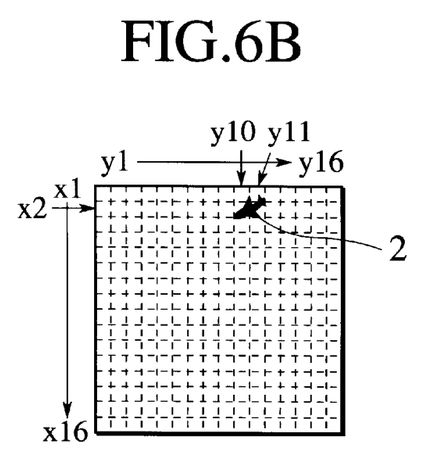

For example, as shown in FIGS. 6A and 6B, in the event that the moving target 2 is detected by dividing the current image and the image taken t second before respectively, if the image is divided into sixteen segments in the vertical and lateral directions respectively, the brightness averages are compared between both images in respective 16×16=256 segments. Then, the motion vectors from the segments ((x2, y10) and (x2, y11)) of the image taken t second before in FIG. 6B to the segments (x11, y72) of the current image in FIG. 6A can be detected. At that time, the resolution of the moving target is equivalent to the segment number of 256.

If the segment number of 200×200=40000, for example, is set to improve the resolution, a considerable calculation time is required.

Therefore, a second embodiment of the present invention to which additional improvement is applied from such point of view will be explained hereunder.

In the second embodiment, the moving target can be acquired in a relatively short time and with high resolution by separating segmentation process and discrimination process of the image into hierarchies, then identifying the segments to be calculated, and then executing calculation process plural times by use of the less segment number.

Figure 7A:
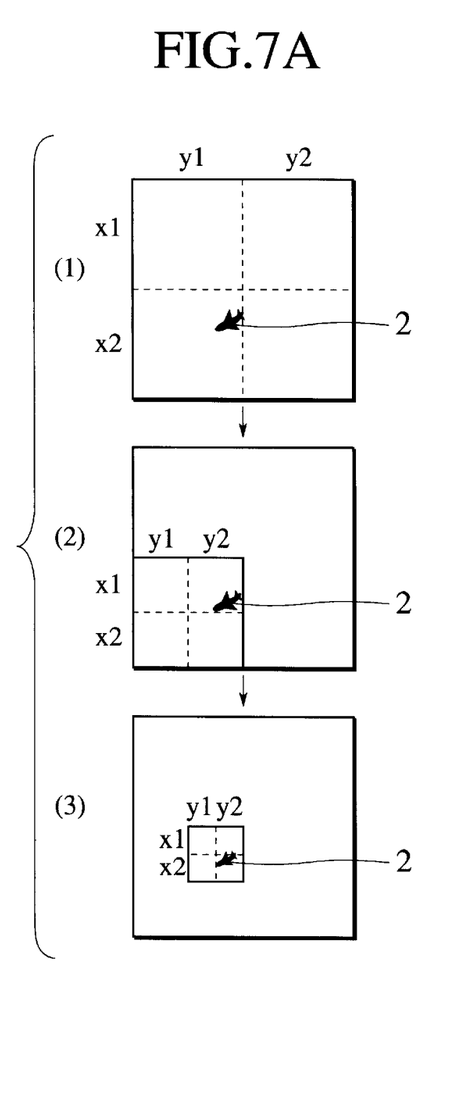
Figure 7B:
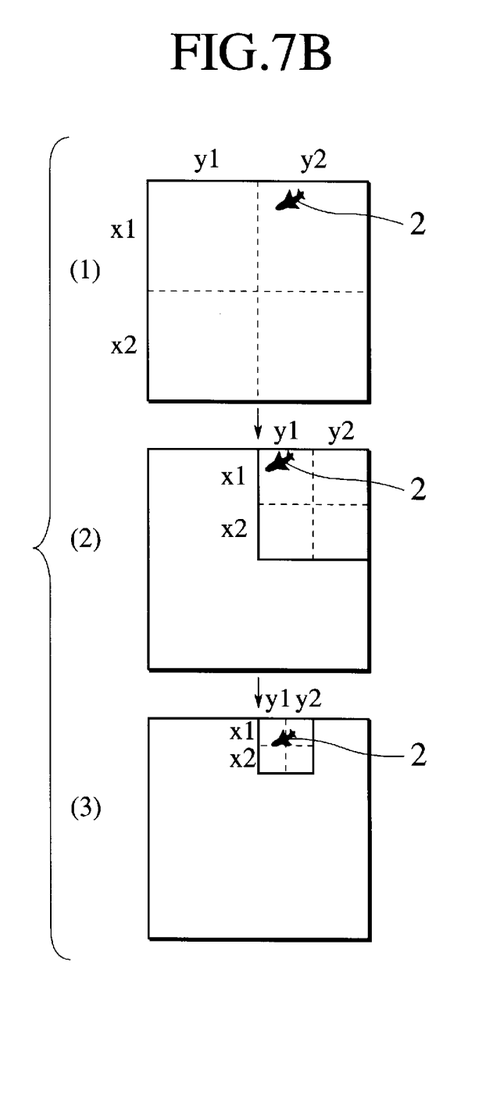

FIGS. 7A and 7B correspond to FIGS. 6A and 6B respectively, and show the current image and the image taken t second before supplied from the image pick-up device 1.

Then, process procedures in the brightness detector 3 and the discriminator circuit 4 will be explained with reference to FIG. 7A and FIG. 7B hereunder.

At first, in the brightness detector 3, as shown in FIGS. 7A(1) and 7B(1), the image is divided into 2×2=4 segments in the vertical and lateral directions, and then the moving target can be detected according to the procedures in the first embodiment.

As a result, it can be known that the moving target 2 has moved from the segment (x1, y2) in FIG. 7B(1) showing the image taken t second before to the segment (x2, y1) in FIG. 7A(1) showing the current image.

Next, a range is narrowed into these segments, i.e., the segment (x1, y2) in FIG. 7B(1) showing the image taken t second before and the segment (x2, y1) in FIG. 7A(1) showing the current image. Then, as shown in FIGS. 7A(2) and 7B(2), similarly the image is divided into 2×2=4 segments in these segments and also the moving target can be detected.

As a result, it can be understood that the moving target 2 has moved from the segment (x1, y1) in FIG. 7B(2) showing the image taken t second before to the segment (x1, y2) in FIG. 7A(2) showing the current image.

In addition, a range is further narrowed into these segments, i.e., the segment (x1, y1) in FIG. 7B(2) showing the image taken t second before and the segment (x1, y2) in FIG. 7B(1) showing the current image. Then, as shown in FIGS. 7A(3) and 7B(3), similarly the image is divided into 2×2=4 segments in these segments and also the moving target can be detected.

Consequently, it can be known that the moving target 2 has moved from the segments ((x1, y1) and (x1, y2)) in FIG. 7B(3) showing the image taken t second before to the segment (x2, y2) in FIG. 7A(3) showing the current image.

In other words, the motion vector, being detected in this manner, which has moved from the segments ((x1, y1) and (x1, y2)) in FIG. 7B(3) showing the image taken t second before to the segment (x2, y2) in FIG. 7A(3) showing the current image coincides with the motion vector which has moved from the segments ((x2, y10) and (x2, y11)) in FIG. 6B showing the image taken t second to the segment (x11, y7) in FIG. 6A showing the current image in FIG. 6.

With the above, since, in the process shown in FIG. 7A and FIG. 7B according to the second embodiment, only the calculation is needed total 12 times respectively, i.e., 24 times as a whole, the process time can be extremely shortened. In addition, the moving target can be detected with the same resolution as that shown in FIG. 6.

That is to say, according to the second embodiment, the segmented process ranges can be identified hierarchically like from FIG. 7A(1) and FIG. 7B(1) to FIG. 7A(2) and FIG. 7B(2), from FIG. 7A(2) and FIG. 7B(2) to FIG. 7A(3) and FIG. 7B(3), and then hierarchy and segmentation structure according to so-called pyramid process can be achieved. Hence, significant shortening of the process time can be implemented because of a small amount of processing data and also the moving target can be detected with high resolution.

As explained above, in the second embodiment, calculation of the brightness average and process/calculation of the motion vector in the brightness detector 3 and the discriminator circuit 4 are made hierarchically, the resolution for detection of the moving target can be enhanced substantially with the reduced segment number in respective hierarchies, the process/calculation time can be reduced substantially, and extraction of the moving target can be realized with high precision.

In the above embodiments, calculation process of the brightness average in respective segments by the brightness detector 3 can be achieved by simple addition process of the digital image signals. Therefore, process can be finished in short time by virtue of the high speed operation, and position detection and tracking of the moving target 2 can be carried out in time according to rapid process calculation.

By the way, in the above embodiments, various detection ways of the moving target have been explained. Next, as a third embodiment of the present invention, a system will be explained wherein target acquire areas are further employed upon detection of the moving target.

In the third embodiment, a system composed of the image pick-up device 1 to take the moving target 2, the brightness detector 3, and the discriminator circuit 4 is similar to those in the first and second embodiments.

Figure 8:
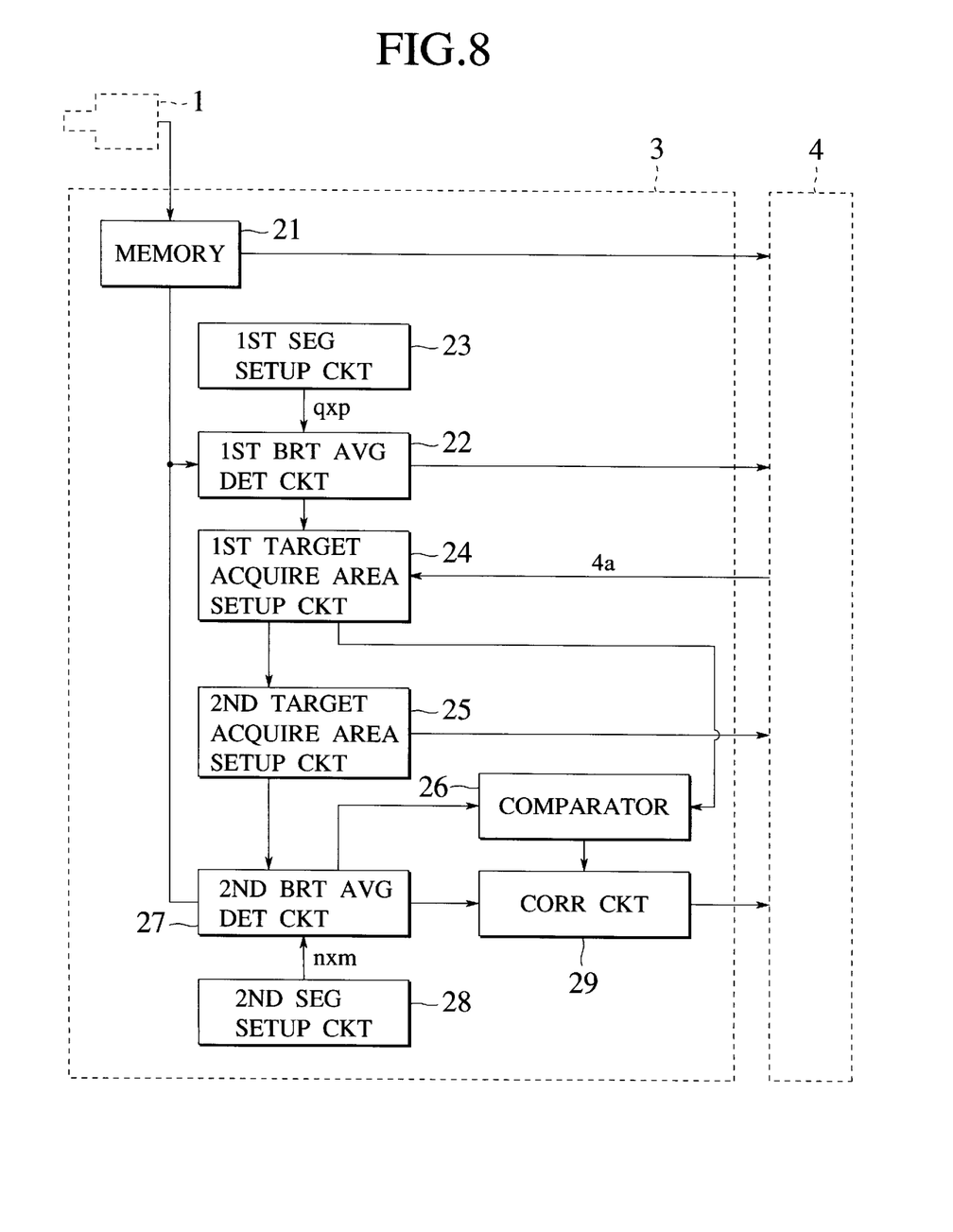
FIG. 8 is a view showing mainly a configuration of a brightness detector according to a third embodiment of the present invention.

FIG. 8 shows a detailed configuration of the brightness detector 3 which is a feature of the third embodiment of the present invention.

In FIG. 8, the image feature value of the spatial domain including the moving target 2 whose image is first picked up by the image pick-up device 1, e.g., digital brightness signals of the moving target 2 are stored into a memory 21 once. Then, the digital brightness signals are read out sequentially and then supplied to the discriminator circuit 4, and also supplied to a first brightness average detector 22 described as "1ST BRT(BRIGHTNESS) AVG(AVERAGE) DET(DETECTOR) CKT(CIRCUIT)" in FIG. 8.

Figure 9A:
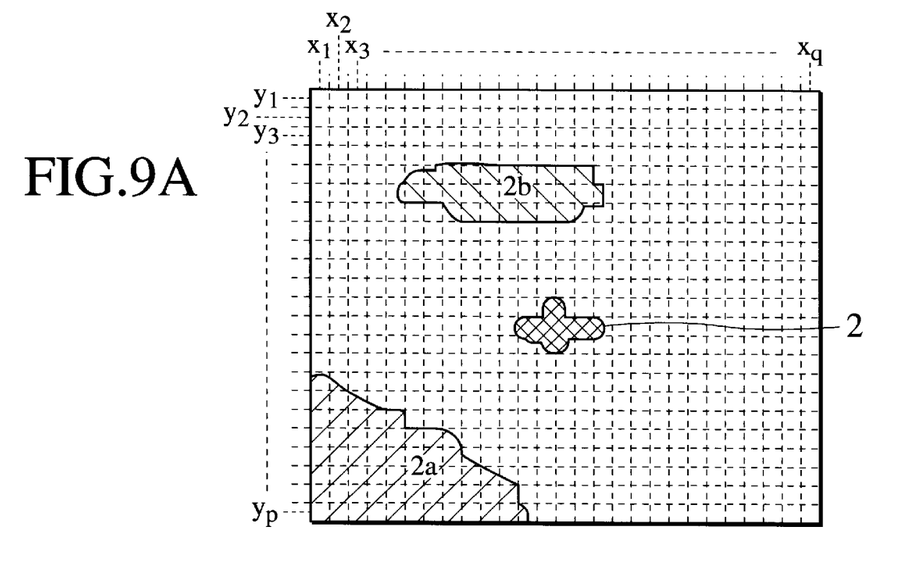
FIG. 9A is a view showing an image pick-up area set by a first segmentation setting circuit shown in FIG. 8.

A first segmentation setting-up circuit 23 is connected to the first brightness average detector 22. As shown in FIG. 9A, in the first segmentation setting-up circuit 23 described as "1st SEG(SEGMENTATION) SETUP (SETTING-UP) CKT(CIRCUIT)" in FIG. 8, a first segmenting signal is set previously which divides the picked-up image into p and q segments at predetermined intervals in the lateral axis (x axis) and the vertical axis (y axis) respectively.

The first brightness average detector 22 receives the first segmenting signal of q×p from the first segmentation setting-up circuit 23 and then divides the image pick-up area into q×p blocks to form the segments, as shown in FIG. 9A. Then, the first brightness average detector 22 calculates the brightness average in respective segments and also calculates the brightness average on the overall screen, and then supplies the brightness average signals in respective segments and the brightness average on the overall screen to a first target acquire area setting-up circuit 24 described as "1ST TARGET ACQUIRE AREA SETUP (SETTING-UP) CKT(CIRCUIT)" in FIG. 8 and the discriminator circuit 4 respectively.

The brightness average on the overall screen is calculated based on respective brightness averages in respective segments. Where the "brightness average value" may be expressed by a gray level representation, for example, 256 tones.

Figure 9B:
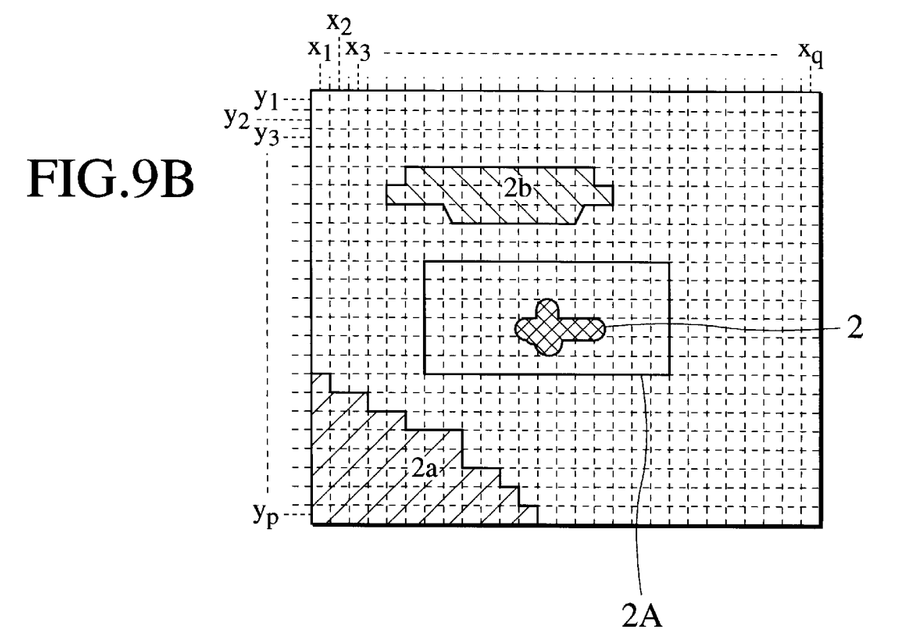
FIG. 9B is a view showing an image pick-up area including an area 2A set by a first target acquire area setting circuit shown in FIG. 8.

Since the target image and the cloud and/or land image can be acquired as patterns formed of continuous segments in which brightness average levels are substantially close mutually, the discriminator circuit 4 can discriminate the segments as the moving target 2 from the segments as backgrounds 2a, 2b in unit of segment, as shown in FIG. 9B, unlike the conventional pixel unit, and then calculate respective location signals.

A location signal 4a of the target 2 of the outputs from the discriminator circuit 4 is supplied to the first target acquire area setting-up circuit 24 in the brightness detector 3. Then, as shown in FIG. 9B, the first target acquire area setting-up circuit 24 can set a first target acquire area 2A having a rectangular frame including the target in its substantially central area, then supplies a signal of the first target acquire area 2A to a second target acquire area setting-up circuit 25 described as "2ND TARGET ACQUIRE AREA SETUP (SETTING-UP) CKT(CIRCUIT)" in FIG. 8 and also supplies the signal of the first target acquire area 2A and the brightness average signals in respective segments in the area 2A to a comparator 26.

Subsequently, after a time of t second has lapsed from first image pick-up, again the spatial domain of the moving target 2 is picked up by the image pick-up device 1, then the digital image signals of the moving target 2 are stored similarly into the memory 21. Then, the digital image signals are supplied to the discriminator circuit 4. Also, out of the stored digital image signals, the digital brightness signals of the spatial domain including the moving target 2 are read sequentially and then supplied to a second brightness average detector 27 described as "2ND BRT(BRIGHTNESS) AVG(AVERAGE) DET(DETECTOR) CKT(CIRCUIT)" in FIG. 8.

The second target acquire area setting-up circuit 25 and a second segmentation setting-up circuit 28 described as "2ND SEG(SEGMENTATION) SETUP(SETTING-UP) CKT(CIRCUIT)" in FIG. 8 are connected to the second brightness average detector 27. The second target acquire area setting-up circuit 25 receives the signal of the first target acquire area 2A from the first target acquire area setting-up circuit 24, then sets a second target acquire area 2A' which corresponds to the first target acquire area 2A and has a rectangular frame including the moving target 2 in its substantially central area, as shown in FIG. 10A, and then supplies a new signal of the second target acquire area 2A' corresponding to the signal of the first target acquire area 2A to the second brightness average detector 27.

Of course, the signal of the first target acquire area 2A itself may be supplied in place of the signal of the second target acquire area 2A' if it can acquire the moving target 2 in its central area.

Figure 10A:
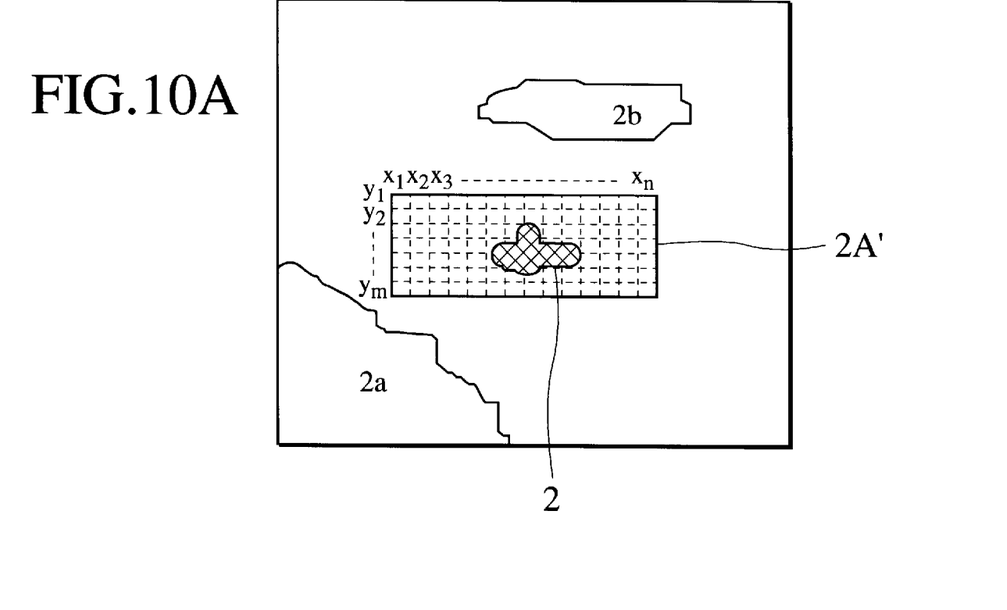
FIGS. 10A and 10B are views showing an image pick-up area used in a second brightness average detector shown in FIG. 8 respectively.

In the second segmentation setting-up circuit 28, as shown in FIG. 10A, a second segmenting signal is set previously which divides the second target acquire area 2A' into n and m segments in the lateral axis (x axis) and the vertical axis (y axis) respectively.

Needless to say, in this case, a pitch of segmentation may be set finer than that in the first segmentation setting-up circuit 23 to improve the detection precision of position of the moving target 2 or the detection resolution to be described later.

Then, like first brightness average detector 22, the second brightness average detector 27 divides the second target acquire area 2A' which is set by the second target acquire area setting-up circuit 25 and includes the moving target 2 into n×m segments according to a segmenting signal from the second segmentation setting circuit 28. Then, the second brightness average detector 27 supplies the brightness averages in respective n×m segments and the brightness average in the second target acquire area 2A' calculated based on these brightness averages to the discriminator circuit 4 via a correction circuit 29 described as "CORR(CORRECTION) CKT(CIRCUIT)" in FIG. 8, and then supplies the brightness average signals in respective n×m segments as well as the location information to the comparator 26.

Then, the discriminator circuit 4 which has received the brightness average signals in respective n×m segments and the brightness average signal in the second target acquire area 2A' via the correction circuit 29 executes similar process to the process using the first brightness average detector 22, then discriminates the moving target 2 from the background in the second target acquire area 2A' out of the image, which has been set by the second target acquire area setting circuit-up 25, and then detects the location of the moving target 2 picked up by the image pick-up device 1 and display it on a display unit (not shown).

As stated above, according to the third embodiment, since the discriminator circuit 4 detects the location of the moving target 2 by comparing the brightness signals by use of limited n×m data within the limited target acquire area 2A', the process of detecting the location of the moving target 2 can be accelerated.

In general, since the image pick-up device 1 is controlled based on output signals of the discriminator circuit 4 and is constructed to always track the acquired target, the first target acquire area setting-up circuit 24 and the second target acquire area setting circuit-up 25 can be firmly controlled such that the moving target 2 is positioned in substantially central areas of respective target acquire areas 2A, 2A' when a time interval (t second) to pick up the image is set short even if the target is moving at high speed.

However, during high speed tracking of the moving target, a relative position relationship between the moving target and the background such as cloud, land, etc. changes relatively rapidly.

Figure 10B:
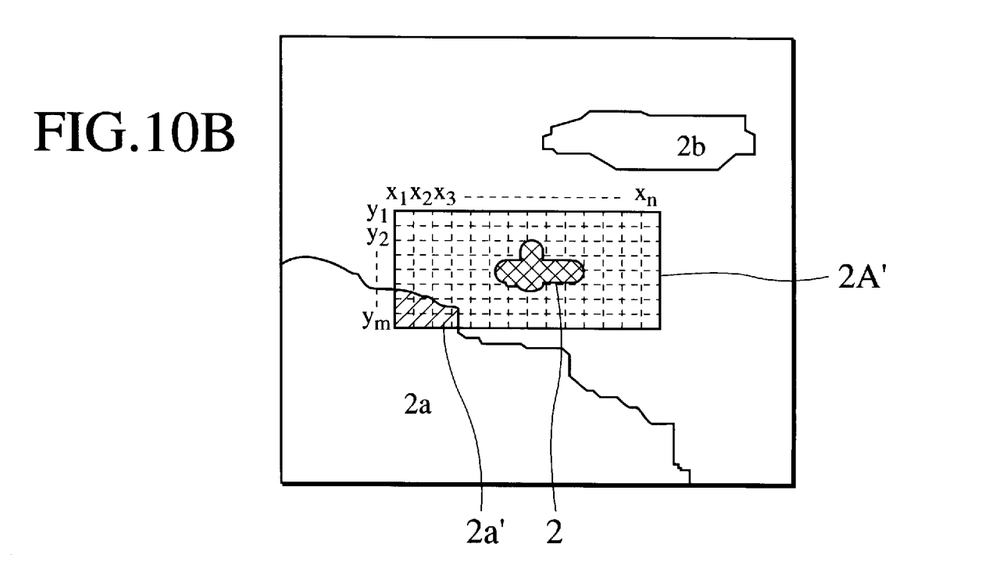
Figure 11:
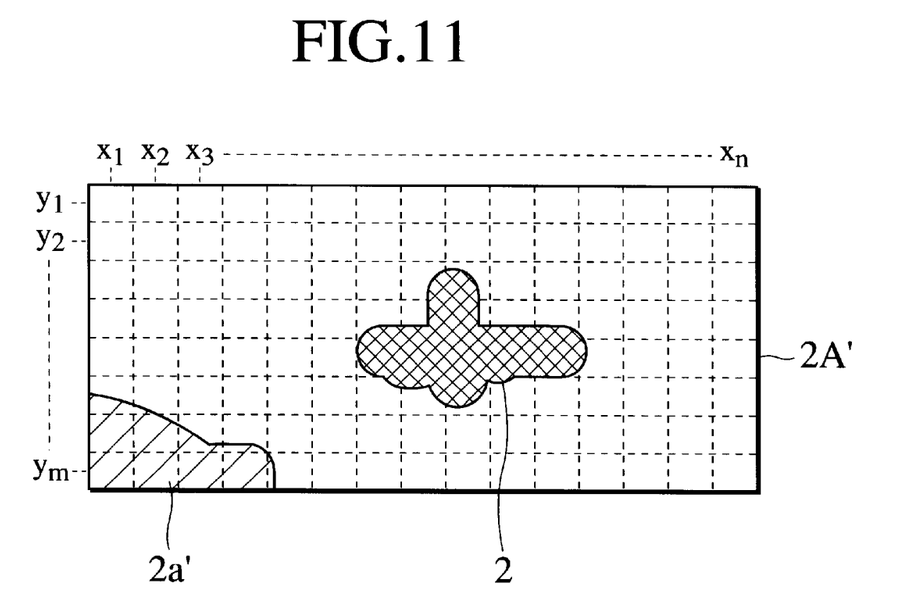
FIG. 11 is an enlarged view showing an area 2A' depicted in FIGS. 10A and 10B respectively.

Accordingly, as for such high speed moving target, after at best almost 0.1 second to 0.2 second, for example, has lapsed from the first image pick-up time shown in FIGS. 9A and 9B, a location relationship between the moving target 2 and the background 2a, 2b also changes, as shown in FIGS. 10A and 10B. Hence, in the state in FIG. 10B, as shown in an enlarged manner in FIG. 11, such a case may be considered that a part of the background 2a newly enter into the second target acquire area 2A'.

Especially, if the brightness level of the image of the background 2a is close to the brightness level of the image of the moving target 2, the brightness average in the second target acquire area 2A' as shown in FIG. 10B comes close to the brightness level of the image of the moving target 2 rather than the case shown in FIG. 10A.

In that case, since the discriminator circuit 4 discriminates the moving target 2 using the brightness average in the second target acquire area 2A' as a reference value, the brightness level as the reference changes and therefore it becomes difficult to discriminate and detect clearly the moving target 2.

Therefore, in the third embodiment, as shown in FIG. 8, a comparator 26 is provided to compare the brightness signal in the area 2A supplied from the first target acquire area setting circuit 24 with the brightness signal in the area 2A' supplied from the second brightness average detector 27, and then supplies a detected brightness component of the background portion 2a' which newly enters into the area 2A' to the correction circuit 29 as a correction signal.

For this reason, the correction circuit 29 corrects the brightness average level in the area 2A' from the second brightness average detector 25 in compliance with the correction signal from the comparator 26. Hence, if a part of the background 2a enters newly into the second target acquire area 2A' and thus the brightness average level comes close to the brightness of the moving target 2, reduction in a detection rate of the moving target 2 can be avoided, whereby the image of the moving target 2 can be acquired with high resolution.

Like this, the comparator 26 and the correction circuit 29 can avoid reduction in the detection rate of the moving target 2 even if the brightness average level comes close to the brightness level of the target 2 because of relative shift of the background so that difference between the brightness average level in the target acquire area 2A comes close to the brightness level of the target 2 is lessened.

In the third embodiment, calculation process of the brightness average in respective segments by the first brightness average detector 22 and the second brightness average detector 27 of the brightness detector 3 can be achieved by simple addition process of the digital image signals. Therefore, process can be finished in short time by virtue of the high speed operation, and a data amount in the discriminator circuit 4 can be extremely reduced by such calculation of the brightness average and the second target acquire area setting circuit 25, and position detection and tracking of the moving target 2 can be carried out in time according to rapid process calculation.

In the above embodiments, explanation has been made that brightness averaging process which is executed based on the digital image signals from the image pick-up device 1 is carried out by a combination of hardwares in the brightness detector 3 and the discriminator circuit 4. However, it is a matter of course that these process and calculation can be conducted on computer software.

What is claimed is:

1. A moving target detecting system comprising:

image pick-up means for picking up as plural screens images of an objective area including at least an identical region on a time series basis;

feature value detecting means for dividing each of the images, which have been picked up by the image pick-up means, into plural segments having substantially identical profiles in different locations and then detecting image feature values in connection with brightness information in respective segments from each of the plural segments; and discriminating means for discriminating the moving target such that the presence and the position of the moving target is identified based on differences in locations between respective segments which exhibit substantially identical image feature values in different screens, by comparing the image feature values in respective segments on one screen out of the plural screens with the image feature values in respective segments on another screen obtained on a time series basis.

2. A moving target detecting system of claim 1, wherein the feature value detecting means reduces stepwise a range of the segments from which the image feature values are to be detected, and the segments in a reduced range are decided based on results obtained by the discriminating means.

3. A moving target detecting system of claim 1, wherein the image feature values are expressed by gray level numbers which indicate a degree of feature in the image feature value.

4. A moving target detecting system of claim 1, wherein the discriminating means discriminates the moving target based on difference in relative locations in the segments which indicate substantially identical image feature values respectively, by comparing the image feature values in respective segments on one screen with the image feature values in respective segments on another screen on a time series basis.

5. A moving target detecting system of claim 4, wherein the discriminating means discriminates the moving target from a background in compliance with a majority principle when the moving target is to be discriminated based on difference in the relative locations.

6. A moving target detecting system of claim 1, wherein the image feature value consists of at least one of brightness, a brightness average, a brightness variance, a brightness change rate, and a brightness differential value.

7. A moving target detecting method comprising the steps of:

picking up as plural screens images of an objective area including at least an identical region on a time series basis;

segmenting the images picked up by the images picking-up step into plural segments each having a substantially identical profile in different locations;

calculating image feature values in connection with brightness information in respective segments which are divided by the segmenting step;

extracting differences in locations between segments which exhibit substantially identical image feature values in different screens as respective vectors, by comparing the image feature values in respective segments of one screen with image feature values of segments of another screen on a time series basis; and identifying the presence and position of the moving target based on respective vectors which have been extracted by the extracting step.

8. A moving target detecting method of claim 7, wherein the separating/detecting step executes separation/detection of the moving target from a background based on respective vectors in compliance with a majority principle.

9. A moving target detecting method of claim 7, wherein the image feature value consists of at least one of brightness, a brightness average, a brightness variance, a brightness change rate, and a brightness differential value.

10. A moving target detecting method comprising:

a step of picking up as plural screens images of an objective area including at least an identical region on a time series basis;

a first segmenting step of segmenting the images, which have been picked up by the images picking-up step into plural segments each having a substantially identical profile in different locations;

a first image feature values calculating step of calculating image feature values in connection with brightness information in respective segments which have been segmented by the first segmenting step;

a first location extracting step of extracting differences in locations between the segments which exhibit substantially identical image feature values in different screens as respective vectors, by comparing the image feature values which have been calculated by the first image feature values calculating step in respective segments of one screen with image feature values calculated in segments of another screen on a time series basis;

a first detecting step of detecting the position of the moving target based on respective vectors which have been extracted by the first location extracting step;

a second segmenting step of segmenting respective segments at least on the two screens, which include the moving target detected by the first detecting step, into plural segments each having another substantially identical profile in different locations;

a second image feature values calculating step of calculating image feature values in respective segments which have been segmented by the second segmenting step;

a second location extracting step of extracting differences in locations between the segments which exhibit substantially identical image feature values as respective vectors, by comparing the image feature values which have been calculated by the second image feature values calculating step in respective segments of one screen with image feature values calculated by the second image feature values calculating step in respective segments on another screen on a time series basis; and a second detecting step of detecting the presence and position of the moving target based on respective vectors which have been extracted by the second location extracting step.

11. A moving target detecting method of claim 10, wherein the first separating/detecting step and the second separating/detecting step can execute separation/detection of the moving target from a background based on the vectors in compliance with a majority principle respectively.

12. A moving target detecting method of claim 10, wherein the image feature value consists of at least one of brightness, a brightness average, a brightness variance, a brightness change rate, and a brightness differential value.

13. A moving target detecting system comprising:

image picking-up means for picking up a first image of an objective area;

first segmenting means for segmenting an area of the first image, which has been picked up by the image picking-up means, into plural segments, having substantially identical profiles, in different locations;

first target detecting means for detecting the target based on image feature values in respective segments formed by the first segmenting means;

first target acquire area setting means for setting up a first target acquire area in which the target detected by the first target detecting means is included therein;

second target acquire area setting means for setting up a second target acquire area corresponding to the first target acquire area in an area of a second image, which has been picked up by the image picking-up means, after the first target acquire area has been set up by the first target acquire area setting means;

second segmenting means for segmenting the second target acquire area, which has been set up by the second target acquire area setting means, into plural segments, having substantially identical profiles, in different locations; and second target detecting means for detecting a position of the target based on the image feature values in respective segments in the second target acquire area, which have been segmented by the second segmenting means.

14. A moving target detecting system of claim 13, wherein the image feature value consists of at least one of brightness, a brightness average, a brightness variance, a brightness change rate, and a brightness differential value.

15. A moving target detecting system of claim 13, wherein the second target detecting means detects the target by correcting the image feature values in different areas of a background when it detects the background, which is different from a background in the first target acquire area, from the second target acquire area.

16. A moving target detecting method comprising:

a first image picking-up step of picking up a first image of an objective area;

a first segmenting step of segmenting an area of the first image, which has been picked up by the image picking-up means, into plural segments, having substantially identical profiles, in different locations;

a first target detecting step of detecting the target based on image feature values in respective segments formed according to segmentation by the first segmenting step;

a first target acquire area setting step of setting up a first target acquire area in which the target detected by the first target detecting step is included therein;

a second image picking-up step of picking up a second image of the objective area after the first target acquire area setting step has been completed;

a second target acquire area setting step of setting up a second target acquire area corresponding to the first target acquire area in the second image, which has been picked up by the second image picking-up step;

a second segmenting step of segmenting the second target acquire area, which has been set up by the second target acquire area setting step, into plural segments, having substantially identical profiles, in different locations; and a second target detecting step of detecting a position of the target based on the image feature values in respective segments in the second target acquire area, which has been segmented by the second segmenting step.

17. A moving target detecting method of claim 16, wherein the image feature value consists of at least one of brightness, a brightness average, a brightness variance, a brightness change rate, and a brightness differential value.

18. A moving target detecting method of claim 16, wherein the second target detecting step detects the target by correcting the image feature values in different areas of a background, when it detects in the second target acquire area the background which is different from a background in the first target acquire area.

* * * * *